US006270632B1

(12) United States Patent
de Vries

(10) Patent No.: US 6,270,632 B1
(45) Date of Patent: Aug. 7, 2001

(54) PROCESS FOR ATMOSPHERIC PRESSURE GLOW DISCHARGE TREATMENT OF A PHOTOGRAPHIC SUPPORT

(75) Inventor: Hindrik Willem de Vries, Tilburg (NL)

(73) Assignee: Fuji Photo Film B.V., Tilburg (NL)

( * ) Notice: Subject to any disclaimer, the term of this patent is extended or adjusted under 35 U.S.C. 154(b) by 0 days.

(21) Appl. No.: 09/416,227

(22) Filed: Oct. 12, 1999

(30) Foreign Application Priority Data

Oct. 9, 1998 (NL) .................................................. 1010287

(51) Int. Cl.[7] ...................................................... B01J 19/08
(52) U.S. Cl. ............................................ 204/164; 204/165
(58) Field of Search ...................................... 204/164, 165

(56) References Cited

U.S. PATENT DOCUMENTS

| | | | | |
|---|---|---|---|---|
| 4,940,521 | * | 7/1990 | Dinter et al. | 204/165 |
| 5,138,971 | | 8/1992 | Nakajima et al. | 118/624 |
| 5,403,453 | | 4/1995 | Roth et al. | 204/164 |
| 5,558,843 | * | 9/1996 | Glocker et al. | 422/186.05 |
| 5,888,713 | * | 3/1999 | Arrington et al. | 204/164 |

FOREIGN PATENT DOCUMENTS

| | | |
|---|---|---|
| 0 467 639 | 1/1992 | (EP) . |
| 0 821 273 | 1/1998 | (EP) . |
| 9-146237 | 6/1997 | (JP) . |
| 9-171240 | 6/1997 | (JP) . |

* cited by examiner

*Primary Examiner*—Kishor Mayekar
(74) *Attorney, Agent, or Firm*—Merchant & Gould P.C.

(57) ABSTRACT

The invention is directed to a process for treating a photographic support in the form of a web, said process comprising providing a first grounded drum shaped electrically conductive electrode and at least one electrically conductive wire electrode of which the diameter varies between 60 and 1500 μm facing said drum shaped electrode, establishing an AC voltage with a frequency range between 100 Hz to 300 kHz over said electrodes, moving the web at atmospheric pressure along said drum shaped electrode, thereby exposing it to atmospheric pressure glow discharge established between the said drum shaped and wire electrode.

10 Claims, 2 Drawing Sheets

PROCESS FOR ATMOSPHERIC PRESSURE GLOW DISCHARGE TREATMENT OF A PHOTOGRAPHIC SUPPORT

FIELD OF THE INVENTION

The invention is directed to a process for treating polymeric supports by an atmospheric pressure glow discharge (APGD) process for improving the surface properties thereof, more in particular for improving the adhesion of photographic emulsions on polymer coated photographic base papers or on polymer film supports, such that the critical coating line speed can be increased.

BACKGROUND OF THE INVENTION

U.S. Pat. No. 5,138,971 discloses a web charging apparatus, i.e. an apparatus that deposit electrostatic charges (ESC) on a moving web, preceding a coating apparatus so as to improve the affinity and adhesion of a coating solution on the web by depositing unipolar electrostatic charges on the surface of the web before the coating solution is applied on the surface. In the web charging apparatus, corona discharge is established with a DC power supply between wire electrodes and the grounded roller, while the wire electrodes are extended perpendicular to the direction of the moving web. The web is supported on a grounded roller or drum shaped electrode, functioning as a grounded electrode relative to the wire electrodes, so that the unipolar electrostatic charges can be deposited on the web. The apparatus according to this patent has the advantage that the coating solution can be easily applied on the web at the start of the coating and it is also possible to prevent the coating solution from being applied too thick. A corona treatment, however, offers several difficulties. One of the important difficulties thereof, associated with the manufacture of photosensitive materials is the occurrence of non-uniformity in photographic coating layer resulting from an uneven distribution of the electrical charge. This originates from non-uniform discharges. Since the photographic layer is a relatively thin layer of a few dozens of microns in thickness, the non-uniform coating severely affects the photographic characteristics as the density unevenness is recognised at the developed sample, such that the photographic products are markedly deteriorated in quality ("blur").

The uneven distribution of the electrical charge can be improved by including a second grounded back-up electrode behind the wire electrodes in the web charging apparatus. It is also known to use a so-called plasma glow discharge process at atmospheric pressure conditions to improve the adhesion of various layers on a substrate. Examples of the use of this process are the treatment of photographic base papers or polymer film supports prior to applying the various layers containing the photographic sensitive emulsions. For example EP-A 0 467 639, U.S. Pat. No. 5,403,453 and EP-A 0 821 273 are directed to this type of process. All these processes have in common that it applies an AC power supply while a noble gas is present between the web and the electrodes. Only the U.S. Pat. No. 5,403,453 also mentions the use of atmospheric air.

The stability of the atmospheric pressure glow discharge with parallel electrode plates (see EP-A 0 467 639 and U.S. Pat. No. 5,403,453) can be realised with expensive gas atmospheres containing mainly helium gas. In case the gas impurities become too high or the power source is outside a specific frequency range the glow discharge may become unstable and a less preferred discharge is obtained like the filamentary discharge. Accordingly, the prior art processes are only functioning within relatively narrow sets of conditions.

EP-A 0 821 273 discloses a method to obtain a plasma glow discharge at atmospheric pressure conditions (mainly in helium gas) between a series of thick Corona electrodes and a grounded drum shaped electrode. The adhesion improvement of the lowest emulsion layer at a polymer film support which is treated with plasma was shown at relatively low linespeeds of 10 m/min.

SUMMARY OF THE INVENTION

The present invention is based on the unexpected phenomenon that a stable glow discharge may be created at atmospheric conditions, using a cheap gas, nitrogen or air, in case electrodes are used having a small diameter (such as between 60 and 1500 $\mu$m), more in particular wire electrodes and a specific frequency range for the AC power supply. Under these conditions it has been found that not only a stable glow discharge is obtained, but also that the web may be moved at speeds far above the speeds disclosed in the prior art, without any problems occurring with the subsequent coating methods.

The invention is accordingly directed to a process for treating a photographic support in the form of a web, said process comprising providing a first drum shaped electrically conductive electrode and at least one electrically conductive wire electrode facing said drum shaped electrode, establishing an AC voltage with a frequency range between 100 Hz to 300 kHz over said electrodes, moving the web at atmospheric pressure along said drum shaped electrode, thereby exposing it to atmospheric pressure glow discharge established between the said drum shaped and wire electrode.

Advantages over the prior art technology are inter alia:

a cheap gas medium of air or nitrogen (if preferred with some oxygen or other gases) can be applied at atmospheric conditions, thus dispensing with the requirement of using noble gases, which are expensive. This provides a significant cost advantage.

The breakdown of the electric discharge voltage will be reduced by the usage of thin wire electrodes instead of the parallel plate electrodes or the series of corona thick electrodes.

The capital investment is low.

The coatability performance of a subsequent coating process will be improved, such that higher line speeds may be realised without detriment to the homogeneity of the coating over the whole width of the web. It is to be noted that in European patent application 0 821 273 only web speeds of 10 m/min are disclosed for polymer film supports, whereas with the present invention much higher linespeeds can be realised.

The invention can be applied for surface treatment of photographic paper supports (like polyethylene-laminated paper, polyethylene terephthalate-laminated paper, polypropylene-series synthetic paper) and of polymeric film supports (like polyethylene terephthalate, polyethylene naphthalate, polycyclohexanedimethanol terephthalate, triacetyl cellulose, cellulose nitrate, polyamide film, polycarbonate film, polystyrene film etc.) just prior to photographic emulsion coating.

Preferably a second grounded electrically conductive back-up electrode is arranged behind said wire electrodes relative to said first grounded drum shaped electrode, resulting in a more even distribution of the electric plasma charge.

According to another preferred embodiment of the invention a dielectric coating may be present on the back-up electrode. This has the advantage that the stability of the glow discharge is improved. It is to be noted that both the stability and the even distribution of the glow discharge may have a positive effect on the coating performance at higher line speeds.

BRIEF DESCRIPTION OF DRAWINGS

The invention will now be elucidated on the basis of the attached FIGS. 1 and 2, wherein.

DETAILED DESCRIPTION OF THE PREFERRED EMBODIMENTS

Figure 1:
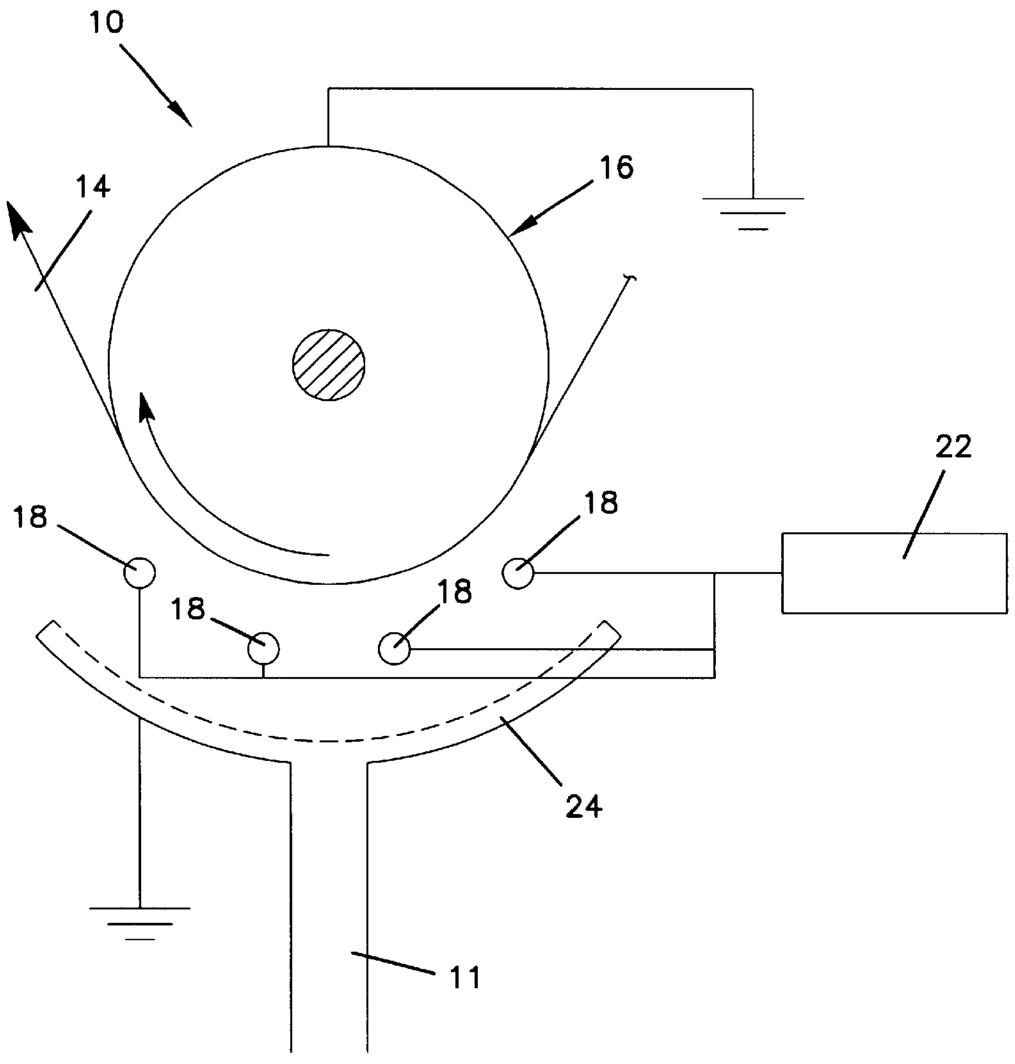
FIG. 1 shows schematically a web treating apparatus for carrying out a preferred embodiment of the APGD process.

As shown in FIG. 1 the web treating apparatus 10 for treating the photographic support by APGD comprises a first drum shaped electrode or a roller 16 that is grounded, discharge electrodes or wire electrodes 18, which are parallel to the axis of the roller 16 and a second grounded back-up electrode or a grounded plate 24 is arranged behind the wire electrodes 18 relative to the roller 16. The roller 16 serves both as a counter electrode and a supporting roller for a moving web 14.

Atmospheric nitrogen, optionally mixed with oxygen or noble gases like helium, or air will be supplied from a duct 11 through the holes of the back-up electrode 24 and the gas flows further between the wire electrodes 18 to the web 14 preferably at a high gas flow rate. From the view point of the reactivity at the surface of the photographic supports nitrogen containing gas (nitrogen content of over 75 vol. %) mixed with some oxygen gas is preferable because these gases are more chemically reactive than the noble gases helium or argon.

The back-up electrode 24 is covered with a dielectric coating, which is beneficial for the stability of the APGD. Various dielectric coating materials can be applied to coat the back-up electrode 24 like for instance ceramics, such as Alumina $Al_2O_3$, Aluminium Silicate $Al_2SiO_5$, Forsterite $Mg_2SiO_4$, Corderite $Mg_2Al_4Si_5O_{18}$, Titanates: $CaTiO_3$, $SrTiO_3$, $BaTiO_3$, and $PbTiO_3$. These dielectric materials can be used in the form of a powder or porcelain. Other dielectrics are $ZrO_2$, $TiO_2$, $SiO_2$ that can be also used for this purpose. Preferably, $Al_2O_3$ is used. Also mixtures of dielectric coating materials may be used. The layer of coating can be applied with flame spraying, though not limited by the deposition technique. A suitable thickness for the dielectric layer for the back-up electrode is between 0.3 mm and 5 mm.

Also the wire electrodes 18 can preferably be coated with the dielectric ceramic materials which are used also for the back-up electrode 24. Basically a thin dielectric coating layer will improve the plasma stability.

A plurality of (e.g. four) wire electrodes 18 is arranged in parallel to each other at regular intervals on a circle concentric with the roller 16, in other words, the wire electrodes 18 are arranged along the path of the web 14. The wire electrodes 18 are made from a conductive material, e.g. tungsten, molybdenum, platinum, and carbon fibre, and preferably tungsten. It has a diameter of between 60 and 1500 $\mu$m. Although stable APGD-plasma can be obtained with wire electrodes having a diameter less than 100 $\mu$m, this is however not preferable because the wire material can not be used for long duration periods.

The APGD-process of the invention can be carried out with wire electrodes which can have different outer shapes (like a circular or a triangular or a rectangular shape). By proper selection of the outer shape and the thickness of the wire electrode as well as the APGD-process conditions the chances for the less preferred Corona discharges can be minimised and the stability of plasma positively influenced. The diameter of the wire electrode is determined as the width of the projection of the wire electrode on the web, in a direction normal to the web. This diameter corresponds accordingly to the width of the wire, that is directed to the web.

The web 14 moves over the roller 16 while being in contact with the outer surface of the roller 16, which is grounded to function as the counter electrode. The distance between each wire electrode 18 and the web 14 supported on the roller 16 is between 1 and 6 mm. The wire electrodes 18 are connected to an AC power source 22 at a frequency range between 100 and 300000 Hz. APGD is established between the wire electrode 18 and the roller 16 via the web 14.

The second grounded back-up electrode or a grounded plate 24 is arranged behind the wire electrodes 18 relative to the roller 16. The grounded plate 24 can be like an arc, or a rectangle of which the width is substantially equal to the width of the roller 16. The grounded plate 24 is made from a metal, e.g. aluminium, copper, iron, stainless steel, or a non-metallic conductor, and it may be covered with dielectric coating material, as discussed above. The back-up electrode has small holes where the gas flow is supplied to the web 14. This ground plate 24 should not be necessarily a rectangular plate. It may be any shape that does not disturb the electrostatic field between the wire electrodes 18 and the web 14.

Figure 2:
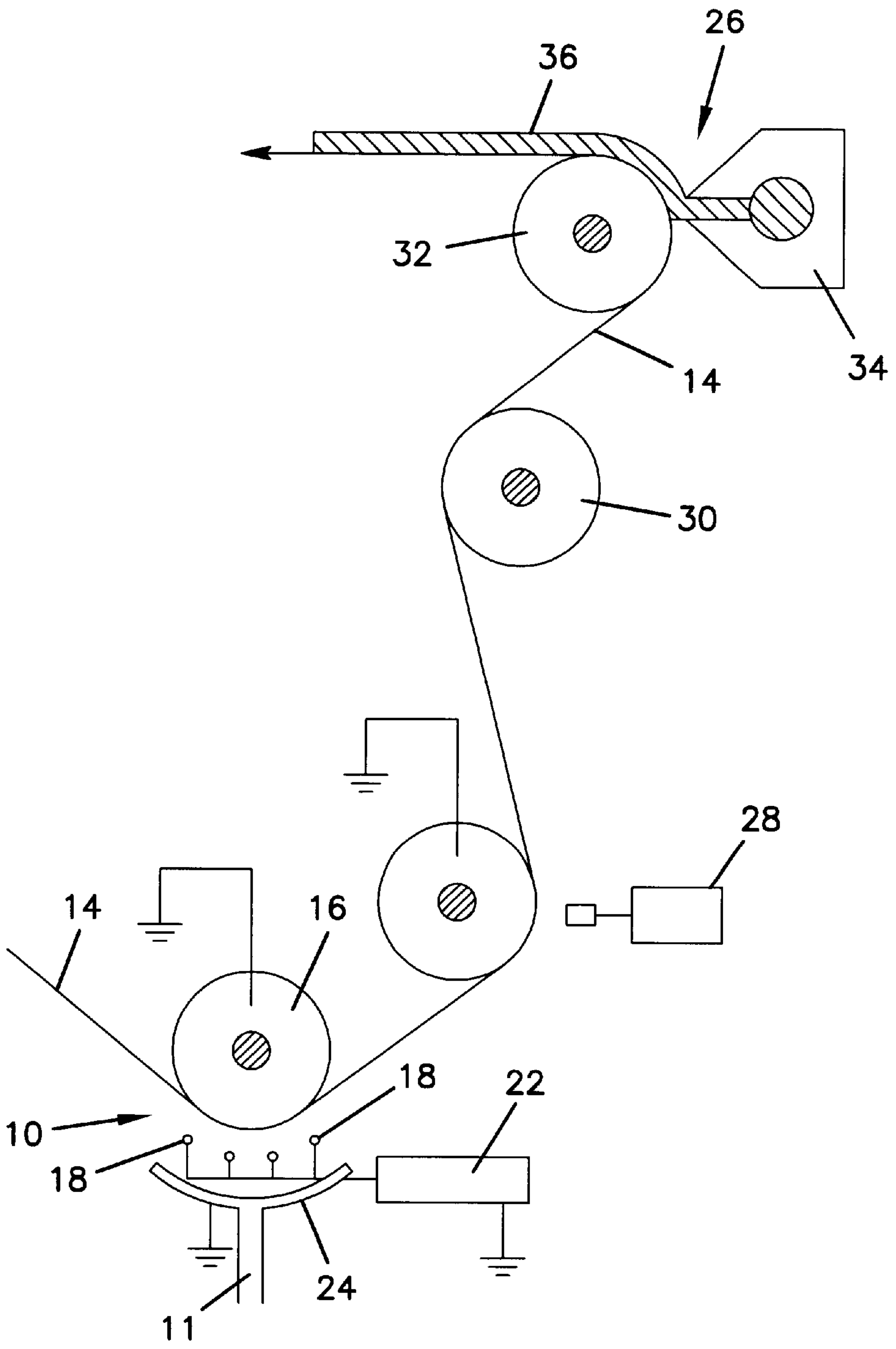
FIG. 2 shows schematically a combination of a web treating apparatus and a web coating apparatus for carrying out a preferred embodiment of the APGD process.

A description will be given of the operation of the web charging apparatus 10, which is constructed in the above-mentioned manner with reference to FIG. 2 showing the path of the web 14 in a coating system that includes the web charging apparatus 10.

As shown in FIG. 2, the web 14 passes through the web charging apparatus 10, and then it reaches a coating apparatus 26. In the web charging apparatus 10, the source 22 applies an AC voltage to wire electrodes 18 so that APGD is established between the wire electrodes 18 and the roller 16 via the web 14. Then, the web 14 reaches the coating apparatus 26via a pass roller 30. A coating head 34 of the coating apparatus 26 applies a coating solution 36 to the surface of the web 14 supported on a back-up roller 32. Thus, the web 14 is coated with the coating solution 36.

During the coating operation, the web surface is treated in APGD, thereby improving the affinity and adhesion of the coating solution 36 to the web 14. As a consequence the coating performance can be improved.

In the present process short exposure periods, for example between in 0.01 to 10 seconds suffice for getting a good result. In this respect it is to be noted that the prior art treatment times tend to vary between 40 sec. and 8 minutes.

WORKING EXAMPLES

The invention is now elucidated on the basis of the following examples, which are not intended to limit the invention.

Example 1

(1) Coating Test

Sample A (ESC Condition)

A description will be given of experiments with the coating system in FIG. 2 including the web charging apparatus 10.

A web 14 was made of polyethylene-laminated paper (a white pigment ($TiO_2$) and a blue dye (ultramarine) were added to the polyethylene layer at the front side), 180 mm in width, and ordinarily used for a photographic color paper. The web 14 was transported at a certain speed. In the web charging apparatus 10, four wires as the wire electrodes 18 were made of tungsten, 150 μm in diameter in which the wire has a circular shape and 200 mm in length. The wire electrodes 18 were arranged in parallel so that each distance to the web 14 was 1.5 mm. The pass roller 16 is connected to ground. The power supply 22 applied a direct voltage of 7000 V to the wire electrodes 18, so that the corona discharge was established between the wire electrodes 18 and the web 14. Thereby, the unipolar electrostatic charges were deposited on the surface of the web 14. Then, the surface electrometer 28 measured the electrostatic potential on the charged surface of the web 14. After the measurement, the coating apparatus 26 applied the coating solution 36 on the web 14.

The discharge current in ESC is relatively low to prevent current breakdown, the low discharge current consequently causes homogeneous treatment of the support. The coating solution 36 is the same as those used in sample 201 in JA 09-146237 (JA means the unexamined published Japanese patent application.). By means of ESC, a charge (equivalent to 600 Volt) was deposited on the web. With the deposition of this charge the maximum coating speed can be raised until a normalised maximum speed $v_{max\ normalized}$. Further increase of the coating speed with 1% results in air entrainment defects. The sample which was obtained at the coating speed $v_{max\ normalized}$ is defined as Sample A.

Sample B (APGD Condition)

The AC-power supply is connected to the same circular Tungsten wire electrodes as for sample A and the pass roller is connected to ground. The atmospheric gas is supplied above the wire electrodes and flows preferably between the wire electrodes in the direction of the web. Atmospheric nitrogen was mixed with 3% oxygen and supplied to the web at a rate of 20 l/min.

With the APGD plasma process, similar coatability experiments were carried out. For the photographic application a frequency of 10 kHz was applied and the maximum coating speed was evaluated before air entrainment defects are formed. All the treatments were carried out in an atmospheric nitrogen/oxygen mixture (97% resp.3%) with an electrode distance of 1 mm(see Table 1).

TABLE 1

Experimental conditions of APGD

| Exp. No. | Atmosphere | Frequency (kHz) | Gap (mm) | Wire diameter (μm) | Air flow (l/min) |
|---|---|---|---|---|---|
| 1 | nitrogen + 3% oxygen | 10 | 1 | 150 | 20 |

Gap: the distance between electrodes 18 and the web 14.

After the glow discharge was established, the coating experiments were carried out. The maximum coating speed can be increased with 4%, because the air entrainment started at 5% higher speed. So, in the case of a polyethylene-laminated surface, a higher maximum coating speed of 1.04 $*v_{max\ normalized}$ can be achieved with the APGD-process than with the ESC-process.

The sample which was obtained at the maximum coating speed of 1.04 $*v_{max\ normalized}$ is defined as Sample B. The exposure time of the web to the glow discharge was about 0.2 s.

(2) The Blur Evaluation

Blur means color and/or density unevenness which is detectable on the developed sample, and the cause is supposed to be the unevenness of surface charging on the PE-laminated paper. Samples A and B were exposed to uniform light source so as to get a gray uniform density. After developing these exposed samples, we evaluated the blur (unevenness of gray density). As for Sample A, blur can be found to some extent, but as for Sample B, we could find less blur. Blur evaluation shows that the APGD treated sample (Sample B) has less blur than the ESC treated sample (Sample A).

The electrostatic potential of Sample A was 600 V. If we made a sample whose electrostatic potential is more than 600 V, the blur became worse.

(3) Adhesion Test

Dry Adhesion Test

Using Samples A and B, making cuts on only coated emulsion layer (not in laminated paper) with knife, putting adhesion tape on them, and after 7 hours this tape was removed. In case of Sample A, some part of emulsion layer was removed, but in case of Sample B, we could find less emulsion removal. The adhesion properties of the APGD treated surface are better than the ESC treated surface.

Wet Adhesion Test

Using Samples A and B, putting them into warm water, rubbing the surface with finger, we evaluated the adhesion strength of emulsion layer in wet condition. In case of Sample A, some part of emulsion layer was removed easily, but in case of Sample B, we could not find any emulsion removal. The adhesion properties of the APGD treated surface are much better than the ESC treated surface even in wet condition.

The disadvantage of the web which is obtained by ESC treatment is that although during coating the adhesion can be improved, the static charge does not improve wet and dry adhesion properties after the coating because the web loses its charge.

Example 2

Sample C (ESC Condition)

The polyethylene-laminated paper (a white pigment ($TiO_2$) and a blue dye (ultramarine) were added to the polyethylene of the first layer side) which contains a thin gelatine coated layer on it was used as the web 14 in the FIG. 1. This paper was manufactured by the same way as sample 101 described in JA 09-171240. Others are the same as FIG. 1.

Coatability of this paper support was investigated under the application of ESC. Under the application of 300 Volt on the web, the maximum normalised coating speed can be increased with 4%, further increase of the web voltage to 600 V can raise the maximum normalised coating speed with 9%. Air entrainment starts if coating speed is further raised, maintaining the same web voltage. Further increase of the web voltage over 600 V caused the increase of blur.

Sample D (APGD Condition)

In the next experiment, the web was exposed to an APGD-process of which the conditions are summarised in Table 1. Under this condition, a stable atmospheric glow discharge can be obtained and the maximum coating speed can be increased with 16%. The exposure time of the web to the glow discharge was about 0.15 s. A further increase of the coating speed results in air entrainment at this power level. Evaluation of blur of both ESC and APGD sample reveals that the APGD treated surface shows less blur than the ESC treated sample.

Due to the strong increase in surface energy of the gelatine, the APGD plasma is very suitable to improve coating speed without the negative effect that ESC has on the blur quality.

Example 3

TAC Coatability Evaluation of ESC Treatment and APGD Plasma Treatment

Sample E (ESC Treatment)

TAC (triacetyl cellulose) was used as the web 14 in FIG. 1. The process conditions for this experiment with ESC-process was comparable as for sample A. A specific maximum normalized coating speed ($v_{max\ normalized}$) was determined at which no entrainment defects happen.

Sample F (APGD Plasma Treatment)

TAC (triacetyl cellulose) was used as the web 14 in FIG. 1. The process conditions for this experiment with APGD-process was comparable as for sample B. A 10% higher maximum coating speed (=1.1 *$v_{max\ normalized}$) was obtained with the APGD treatment (sample F) than for the ESC-process (sample E)

Example 4

In FIG. 1 various APGD-conditions were selected and compared with the plasma glow stability. The condition and results are summarized in Table 2. When the wire diameter is 50 μm, the wire can easy break which is not preferred. the view points of the plasma stability and also wire durability, the most preferable condition is that the wire diameter varies between 150 and 1000 μm. Nitrogen gas with oxygen is preferred.

TABLE 2

Plasma glow stability

| Sample | Wire diameter (μm) | Frequency (Hz) | Voltage (kV)) | Gas | Gas flow (l/min) | Gap distance | glow stability | special effects |
|---|---|---|---|---|---|---|---|---|
| ESC | 150 | DC | 7 | air | no | 4 | good | |
| 1 | 50 | 500 | 3 | Ar | 20 | 2 | good | too brittle material |
| 2 | 150 | 5000 | 3 | Ar | 20 | 2 | good | |
| 3 | 1500 | 5000 | 3 | Ar | 20 | 2 | good | |
| 4 | 2000 | 5000 | 3 | Ar | 20 | 2 | poorer | strong filamentary discharges at edges |
| 4 | 150 | 10000 | 4 | N2 | 20 | 1 | good | |
| 5 | 150 | 10000 | 4 | N2 | 20 | 3 | poor | |
| 6 | 150 | 10000 | 5 | N2 | 20 | 5 | very poor | filamentary discharges |
| 7 | 150 | 5000 | 3 | N2 + 3% O2 | 20 | 1.5 | good | |

The claimed invention is:

1. A process for treating a photographic support in the form of a web, said process comprising providing a first grounded drum shaped electrically conductive electrode and at least one electrically conductive wire electrode of which the diameter varies between 60 and 1500 μm facing said drum shaped electrode, establishing an AC voltage with a frequency range between 100 Hz and 300 kHz over said electrodes, moving the web at atmospheric pressure along said drum shaped electrode to expose said web to atmospheric pressure glow discharge established between the said drum shaped and wire electrodes, wherein a second grounded electrically conductive back-up electrode is arranged behind said wire electrodes relative to said first grounded drum-shaped electrode.

2. A process according to claim 1, wherein the time of exposure of the web to said atmospheric pressure glow discharge is between 0.01 and 10 seconds.

3. A process according to claim 1, wherein the web moves at atmospheric pressure in a gas atmospherc selected from the group consisting of nitrogen, oxygen, argon, helium or combinations of these gases.

4. A process according to claim 1, wherein said wire electrodes have a circular or a triangular or a rectangular shape.

5. A process according to claim 1, wherein the web of a photographic support comprises a photographic base paper or a photographic polymer film.

6. A process according to claim 5, wherein the photographic base paper is provided on at least one surface thereof with a polymeric coating which can be coated with or without a thin gelatine sublayer.

7. A process according to claim 6, wherein the polymeric coating is based on a polyolefin resin.

8. A process according to claim 5, wherein the web of photographic film comprises polyethylene terephtalate or polyethylene naphthalate or triacetyl cellulose.

9. A process according to claim 8, wherein the photographic support is exposed to the atmospheric pressure glow discharge process and further comprises at least one photographic emulsion layer.

10. A process for treating a photographic support in the form of a web, said process comprising providing a first grounded drum shaped electrically conductive electrode and at least one electrically conductive wire electrode of which the diameter varies between 60 and 1500 μm facing said drum shaped electrode, establishing an AC voltage with a frequency range between 100 Hz and 300 kHz over said electrodes, moving the web at atmospheric pressure along said drum shaped electrode to expose said web to atmospheric pressure glow discharge established between the said drum shaped and wire electrodes, wherein a second grounded electrically conductive back-up electrode is arranged behind said wire electrodes relative to said first grounded drum-shaped electrode and wherein the surface of the second grounded back-up electrode is covered with a dielectric coating.

* * * * *